United States Patent [19]

Linko, III et al.

[11] 4,198,839

[45] Apr. 22, 1980

[54] METHOD FOR MAKING LIGHTWEIGHT COMPOSITE ARTICLE

[75] Inventors: Peter J. Linko, III, Cincinnati; William R. Butts, Milford; Susan L. Awalt, Cincinnati; Charles E. Glynn, Hamilton, all of Ohio

[73] Assignee: General Electric Company, Cincinnati, Ohio

[21] Appl. No.: 897,619

[22] Filed: Apr. 19, 1978

[51] Int. Cl.$^2$ .................................................. B21B 1/00
[52] U.S. Cl. ................................. 72/199; 29/90 R; 29/455 LM; 72/366; 428/116; 228/114; 228/181
[58] Field of Search ..... 29/90 R, 455 LM, 157.3 AH; 72/199, 366, 364; 428/116, 117, 118, 119; 228/112, 114, 181, 265

[56] References Cited

U.S. PATENT DOCUMENTS

| | | | |
|---|---|---|---|
| 2,586,011 | 2/1952 | Doelter | 29/157.3 AH |
| 3,368,314 | 2/1968 | Maynard | 29/455 LM |
| 3,606,708 | 9/1971 | Plichta et al. | 29/90 R |
| 3,613,319 | 10/1971 | Takimura et al. | 72/199 |
| 3,689,971 | 9/1972 | Davidson | 29/455 LM |
| 3,906,604 | 9/1975 | Kakizaki et al. | 228/112 X |
| 4,023,252 | 5/1977 | Levinstein et al. | 428/650 |
| 4,031,279 | 6/1977 | Cremer et al. | 428/116 |
| 4,039,296 | 8/1977 | Levinstein | 428/553 |

OTHER PUBLICATIONS

Machinery's Handbook, 17th Edition, 1964, p. 2043g.

Primary Examiner—Ervin M. Combs
Attorney, Agent, or Firm—Lee H. Sachs; Derek P. Lawrence

[57] ABSTRACT

An improved lightweight composite article comprises a base portion and a spaced apart cap portion between which is secured a body portion comprising a plurality of thin metallic ribbons secured between the base portion and cap portion. The ribbons are disposed in substantially unbonded, aligned relationship at an upper wall portion which is integral with the cap portion formed from top edge extensions of the ribbons. The cap portion is disposed angularly to the body portion to provide one boundary of interstices defined within the member. Such a lightweight, porous-type member can be provided with a relatively smooth, substantially continuous surface through the rubbing or smearing of portions of the member surface with a smooth, relatively hard moving rubbing surface such as the peripheral smooth rim surface of a rotating wheel.

4 Claims, 4 Drawing Figures

METHOD FOR MAKING LIGHTWEIGHT COMPOSITE ARTICLE

The invention herein described was made in the course of or under a contract, or a subcontract thereunder, with the United States Department of the Air Force.

FIELD OF THE INVENTION

This invention relates to lightweight porous-type composite articles and, more particularly, to composite articles including a honeycomb-type body secured to a backing member such as for use in a labyrinth-type seal and to providing porous-type members or articles with a relatively smooth, continuous surface.

BACKGROUND OF THE INVENTION

In the operation of turbomachinery such as gas turbine engines, there are requirements to inhibit air or gas flow between certain portions of the engine. For example, in an axial flow gas turbine engine, it is desirable to inhibit flow between stages of the compressor and of the turbine such as by interstage leakage across the tips of blading members. In addition, portions of the compressor section and of the turbine section are isolated above rotating shafts and drums through the use of abradable labyrinth-type seals, one element of which can be a porous or a honeycomb-type structure, for example cooperating with at least one opposed tooth member. Frequently such a honeycomb structure is filled with a porous abradable material which is abraded away upon contact with an opposing member when there is relative rotation between such components. One type of such a seal member is described in U.S. Pat. No. 3,916,054—Long et al, issued Oct. 28, 1975, the disclosure of which is incorporated herein by reference.

Although there has been a variety of such seal members identified, gas turbine engine experience has shown that a smooth, substantially continuous surface decreases air turbulence which might otherwise be generated through use of an open cell honeycomb or labyrinth-type member such as is described in the above-incorporated and other prior art patents. As a result of such air turbulence, temperature increases have been observed across such a seal. Such increased temperature can affect the mechanical properties of components downstream of the seal.

SUMMARY OF THE INVENTION

It is one object of the present invention to provide an improved lightweight composite article useful as a turbomachinery seal and including a smooth surface or cap portion integral with the body of the seal to reduce turbulence and provide a reliable surface for the seal.

Another object of the present invention is to provide an improved method for generating a relatively smooth, substantially continuous surface for a lightweight, porous member useful as a turbomachinery seal surface.

These and other objects and advantages will be more clearly understood from the following detailed description, examples and the drawing, all of which are intended to be typical of rather than in any way limiting on the scope of the present invention defined by the appended claims.

Briefly, one form of the present invention is a lightweight composite article comprising a base portion, a cap portion in spaced relationship with the base portion and a body portion between and secured with the base portion and with the cap portion. The body portion comprises a plurality of thin wall metallic ribbons secured at a lower wall portion with the base portion, which can be a backing member, a joint between the lower wall portions, etc. The ribbons are disposed in substantially unbonded, aligned relationship at an upper wall portion and include means to separate them in order to provide interstices therebetween. The cap portion is integral with and formed from top edge extensions of the wall ribbons opposite the lower wall portions. The extensions are deformed over one another and disposed angularly to the body portion in order to provide a cap surface as one boundary of the interstices.

One form of the method associated with the present invention includes providing a predetermined excess of material at the surface of a lightweight porous member sufficient to provide a cap portion. As used herein the term "lightweight porous member" includes members having pores, voids, interstices or loosely held particles. Then the member surface is rubbed with a hard, smooth, substantially non-grinding tool surface while pressing the tool surface generally toward the member surface to deform or smear member surface material thus to provide a smooth, substantially continuous cap portion on the member.

DESCRIPTION OF THE PREFERRED EMBODIMENTS

Figure 1:
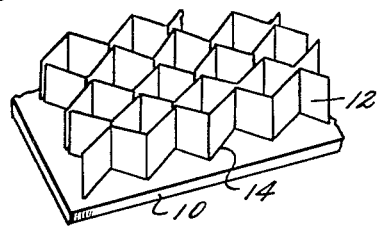
FIG. 1 is a fragmentary, perspective, diagrammatic view of a prior art honeycomb structure on a backing member.

One form of the present invention can be used with the type of structure shown in the fragmentary, perspective, diagrammatic view of FIG. 1, identified as being well known in the prior art. Such a structure includes a backing member 10 and a honeycomb-type core 12 joined such as by brazing at 14 to the backing member. As is well known in the art, such honeycomb core can be made in a variety of configurations and generally is formed from shaped metallic ribbons bonded at adjacent nodes to define the honeycomb core structure. Another form of the present invention can be used with surfaces which are porous or of loosely held particles as well as with lightweight filler or coating materials, including clearance control coatings, materials or seals of the type described in U.S. Pat. Nos. 3,964,877—Bessen et al; 4,023,252—Levinstein et al and 4,039,269— Levinstein, the disclosure of each of which is incorporated herein by reference.

Figure 2:
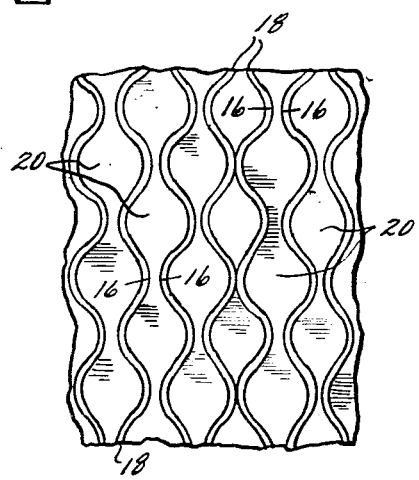
FIGS. 2 and 3 are enlarged, fragmentary, top views of honeycomb-type structures useful in one form of the present invention.
Figure 3:
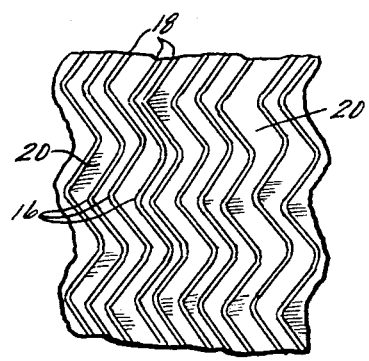
Figure 4:
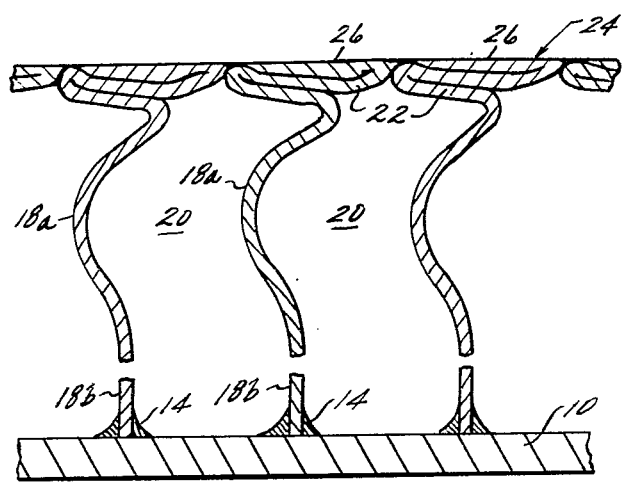
FIG. 4 is an enlarged, fragmentary, sectional view of one form of the structure of the present invention.

In connection with the workpiece member shown in the drawing and useful with the present invention, the body portion or core identified as 12 in FIG. 1 is secured with the backing member 10 such as by brazing at joint 14, or the ribbons 18 in FIGS. 2,3 and 4 are joined such as by brazing, welding, etc. to form a base portion represented by backing member 10 in the drawing. Such core is characterized by the fact that the ribbons are substantially unbonded and relatively free moving at an upper wall portion even though they are in aligned relationship. Two forms of such a structure are shown in the enlarged, fragmentary, top views of FIGS. 2 and 3 looking through the honeycomb toward the backing member or base portion. Such a structure includes a plurality of nodes or corrugations 16 in FIGS. 2 and 3 which are representative of means to separate metallic wall ribbons 18, thus providing a plurality of interstices such as 20 between the wall ribbons.

Another type of member which can be used as a workpiece in the practice of the present invention is a porous, sintered powder metal compact of a type used commercially in a variety of compositions, densities and cohesive strengths to satisfy an intended application such as a seal member. One example is a commercial Ni-Cr alloy, sometimes called Nichrome alloy, one form of which is used in about a 35% dense condition as a seal member having good abradability and good oxidation and erosion resistance up to about 1400° F.

Still another type of member useful as a workpiece in the present method is a thermal sprayed coating, for example of the types described in the above three patents incorporated herein by reference. As was indicated, such a coating has a relatively rough surface, for example 400-2000 AA microinch in roughness, which can contribute to turbulence of a gas flowing over the coating surface. The term "AA microinch" is defined in American National Standard, ASA B46.1-1962, Surface Texture, ASME, page 16, A-2, Arithmetical Average (AA).

According to the method of the present invention, the workpiece which includes pores, voids, interstices or loosely held particles, for example of the above-described types, is sized at a top surface or portion. This step provides a uniform surface while leaving a sufficient predetermined amount of material in excess of that required in the completed member from which a relatively smooth, substantially continuous cap portion can be generated. Thereafter, a smooth, hard surface is moved along and rubbed into the sized surface in an amount to generate sufficient heat in the sized surface, without grinding it away, to smear the surface Thus, there is generated a smooth cap portion the surface of which is finished in the range of up to about 63 AA microinch and therefore which resists contributing to turbulent flow of gas across the cap surface.

One form of the lightweight composite article resulting from practice of such method is shown in the enlarged fragmentary sectional view of FIG. 4 wherein the lower wall portion 18b of the wall ribbons 18 are secured such as by brazing at joint 14 to backing member 10. Upper wall portions 18a of wall ribbons 18 are substantially unbonded and are in aligned relationship to define therebetween interstices 20. Together, upper and lower wall portions 18a and 18b, respectively, define the body portion of the composite structure.

Integral with and formed from top edge extensions 22 of wall portions 18a by the method of the present invention is a cap portion shown generally at 24 in FIG. 4. Such a cap portion is formed by extensions 22 being deformed over one another during the present method to dispose them angularly to the body portion thus to provide a cap surface 26 as one boundary of the interstices 20. The lengths of the top edge extensions beyond that required for ribbons 18 is defined by the spacing between the ribbons, for example about 0.05" for honeycomb having openings of about 0.04". The length is selected to be of an extent sufficient to provide a closure of at least about 80% across interstices 20 and upper wall portions 18a, defining a smooth cap surface having a surface finish of a maximum of about 300 AA microinch. Other types of workpieces, such as are described above, can be sized similarly to provide the appropriate excess material. Such a surface finish is preferred for use of the composite member in turbomachinery in order to reduce turbulent fluid flow across the cap surface 26. The embodiment shown in FIG. 4 was a portion of an arcuate seal use in the compressor around a shaft structure to control airflow in a gas turbine engine.

The method of the present invention in its form for providing a lightweight composite member, for example of the type shown in FIG. 4, employs as a preliminary workpiece a structure of the type shown in FIG. 1. Such workpiece includes a backing member 10 and a body portion 12 secured to the backing member such as at joint 14 by brazing. The wall ribbons 18 of body portion or core 12 are sufficiently large in their dimension extending away from the backing member 10 to provide top edge extensions, for example of at least about 0.02" and generally in the range of about 0.04–0.3". Conveniently, such top edge extensions are a part or appear to be a part of the wall ribbons. Such extensions are shown in their deformed form at 22 in FIG. 4 of an extent sufficient to form a cap portion.

Such a preliminary workpiece is dimensionally sized, such as by electrochemical grinding, to refine and make more uniform the tips of such top edge extensions. Then the cap portion shown generally at 24 in FIG. 4 is generated by smearing or rubbing the top edge extensions with a smooth hard surface of a tool, such as the rim surface at the periphery of a wheel, at a rate which is sufficient to generate heat in the edge extensions in order to facilitate plastic flow of the extension material without causing metallurgical transformation. Such action draws the top edge extensions over one another thus providing a smooth cap surface 26 as shown in FIG. 4. Such a smearing action can be accomplished with a hard metal wheel as the tool, of the general configuration of a grinding wheel but having a smooth, non-grinding working surface of a maximum of 63, and preferably in the range of 16-32, AA microinch finish. Use of a hard surface such as in the form of a wheel enables control of relative movement between the wheel and, in the embodiment shown in the drawings, the top edge extensions. In this way, heat is generated in the top edge extensions sufficient to draw the top extensions over one another and to provide a smooth cap surface, preferably of a finish no greater than about 300 AA microinch and preferably in the range of 25-250 AA microinch. In one specific example with such embodiment, in order to obtain at least about 80% closure of the interstices within the body portion of the structure, a nickel-base superalloy solid wheel made of a commercially available nickel-base alloy sometimes referred to as Inconel 718 alloy was provided with a peripheral rim surface finish of no greater than 63 AA microinch. Such a wheel was rotated to provide a peripheral surface speed of about 2900 surface feet per minute relative to the workpiece surface and then such peripheral surface was pressed against tip edge extensions of wall ribbons made from a commercially available alloy sometimes referred to as Incoloy 600 alloy. The rubbing or smearing which resulted from such contact with the tool was continued until the desired, predetermined dimensions of the composite member were attained. Surface closure was in the range of at least about 80%; in this example it was about 90% closure.

In another series of evaluations of the method of the present invention, workpieces were prepared in the form of seal members as described in the above-incorporated U.S. Pat. Nos. 4,023,252 and 4,039,296. Such members included an abradable coating portion as the fusion and interaction product which resulted from thermal deposition of the powder materials described. Respectively, these were an aluminum-bronze/nickel graphite coating portion and a NiCr-base alloy (Metco 443 material)/nickel graphite coating portion. After thermal deposition, such coating portions had a rough, porous surface with a finish in the range of about 400–2000 AA microinch.

According to the present invention, a nonmetallic wheel was used as the tool to smear the surfaces of such coating portions. Such a wheel was prepared with a smooth operating surface at its peripheral rim by treating a conventional grinding wheel to dull or load the operating surface, thereby reducing its cutting or grinding ability. The wheel in various examples was rotated at a rate in the range of about 2500–6000 and preferably about 4000–5000 surface feet per minute and was pressed against the rough coating surface to generate surface finished as low as 25 AA microinch, with a range of 63–200 AA microinch being typical.

Although the present invention has been described in connection with specific examples and embodiments, it will be recognized by those skilled in the art that the present invention is capable of variations and modifications within the scope of the appended claims. For example, therefore can be variations in the size and shape of the body portion of the structure, such as by varying the size, thickness and configuraton of the wall ribbons, by varying the porosity, density, cohesive strength, etc. of the lightweight porous member, etc. In addition, other means in addition to brazing, for example welding, tack welding, etc., can be used to secure the lower wall portion or to the body portion backing member or to each other to form a base portion. It is intended by the appended claims to cover all variations and modifications of which the invention is capable.

What is claimed is:

1. In a method for making a smooth, substantially continuous smeared cap portion on a lightweight porous member, the steps of:
   providing a predetermined excess of material of the member at a member surface in an amount sufficient to provide the cap portion; and then,
   rubbing a hard, smooth, substantially nongrinding tool having a surface finish of up to about 63 AA microinch across the member surface at a rate of 2500 to about 6000 surface feet per minute relative to the member surface, while pressing the tool generally toward the member surface to generate sufficient heat to smear and deform material of the surface and to provide the surface with a smooth, substantially continuous, smeared cap portion having a surface finish of about 25–300 AA microinch.

2. The method of claim 1 in which:
   the tool is in the shape of a wheel having a working surface on its outer peripheral rim finished in the range of about 16–63 AA microinch, and
   the wheel is rotated to provide at its peripheral rim a rotational rate of about 2500–6000 surface feet per minute relative to the member surface.

3. The method of claim 2 in which:
   the member includes a body portion comprising a plurality of thin wall metallic ribbons secured at a lower wall portion and disposed in substantially unbonded, aligned relationship at an upper wall portion adjacent the member surface, the ribbons including means to separate the ribbons to provide interstices therebetween, the ribbons including top edge extensions to provide the predetermined excess of material of the member;
   the tool is a metal wheel being rotated to provide at its peripheral rim a rotational rate of about 2900–6000 surface feet per minute relative to the member surface sufficient to generate heat in the top edge extensions to deform the extensions over one another, providing a cap portion having a surface finish of about 63–250 AA microinch.

4. The method of claim 2 in which:
   the member includes a thermally disposed coating as the member surface; and
   the wheel is rotated to provide a rotational rate of about 4000–5000 surface feet per minute.

* * * * *

UNITED STATES PATENT AND TRADEMARK OFFICE
CERTIFICATE OF CORRECTION

PATENT NO. : 4,198,839
DATED : April 22, 1980
INVENTOR(S) : Peter J. Linko, III; Susan L. Awalt; William R. Butts; & Charles E. Glynn It is certified that error appears in the above—identified patent and that said Letters Patent is hereby corrected as shown below:

Column 6, line 10, claim 1, the words "2500 to about 6000" should read "about 2500 to 6000".

Column 6, line 42, claim 4, delete "disposed" and in its place insert --deposited--.

Signed and Sealed this

Fifth Day of August 1980

[SEAL]

Attest:

SIDNEY A. DIAMOND

Attesting Officer

Commissioner of Patents and Trademarks